R. M. G. PHILLIPS.
AUTOMATIC COOKING APPARATUS.
APPLICATION FILED OCT. 9, 1914.
1,161,523.
Patented Nov. 23, 1915.
3 SHEETS—SHEET 2.
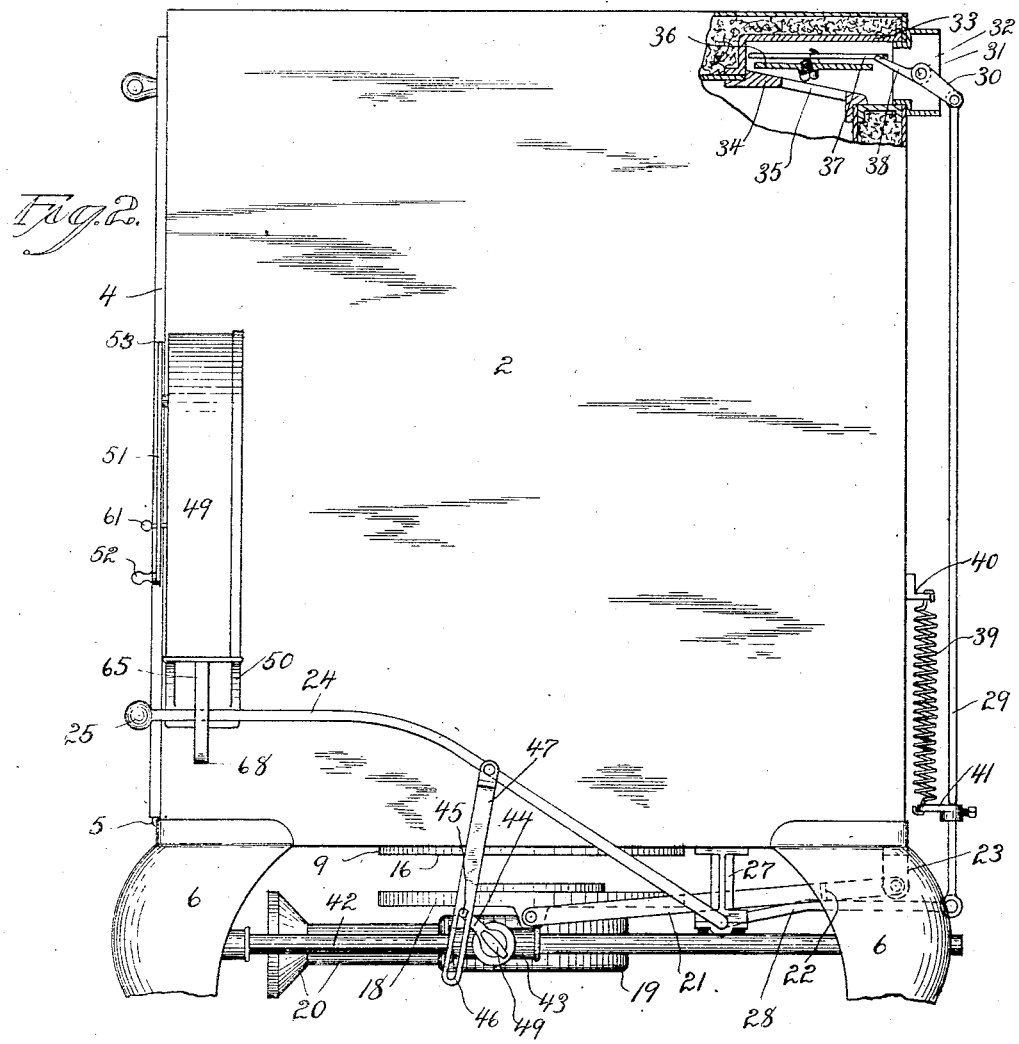
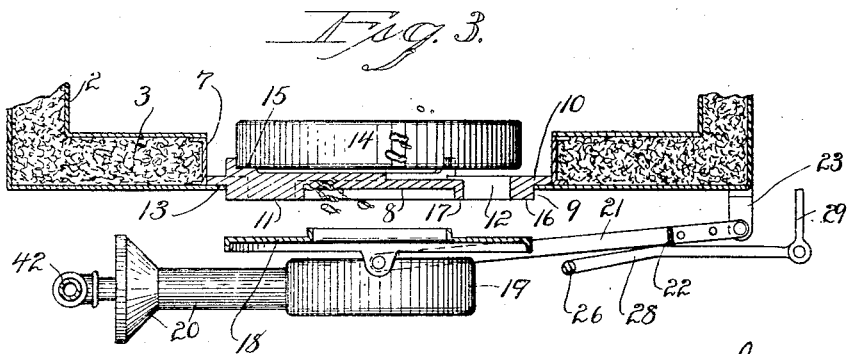

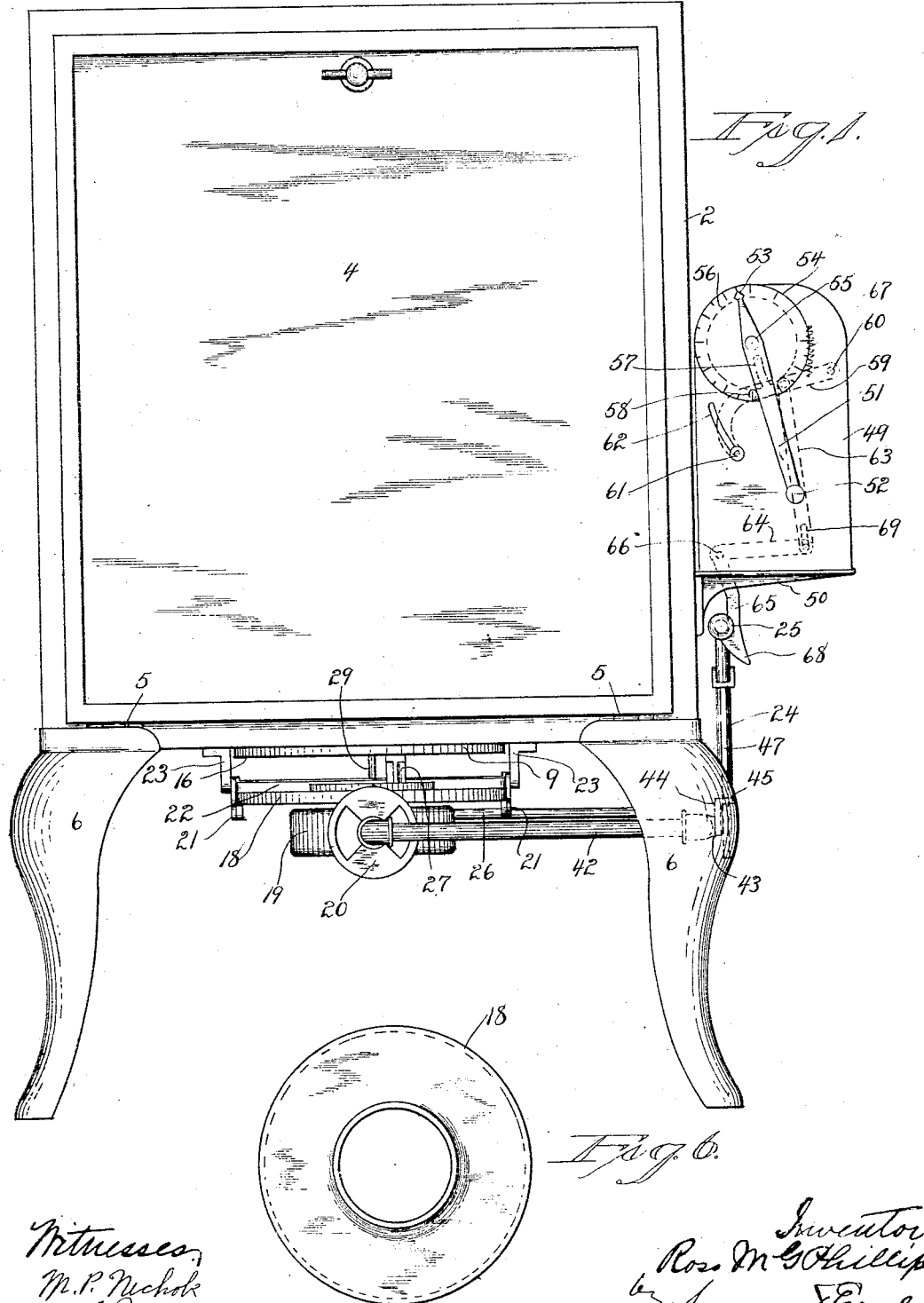

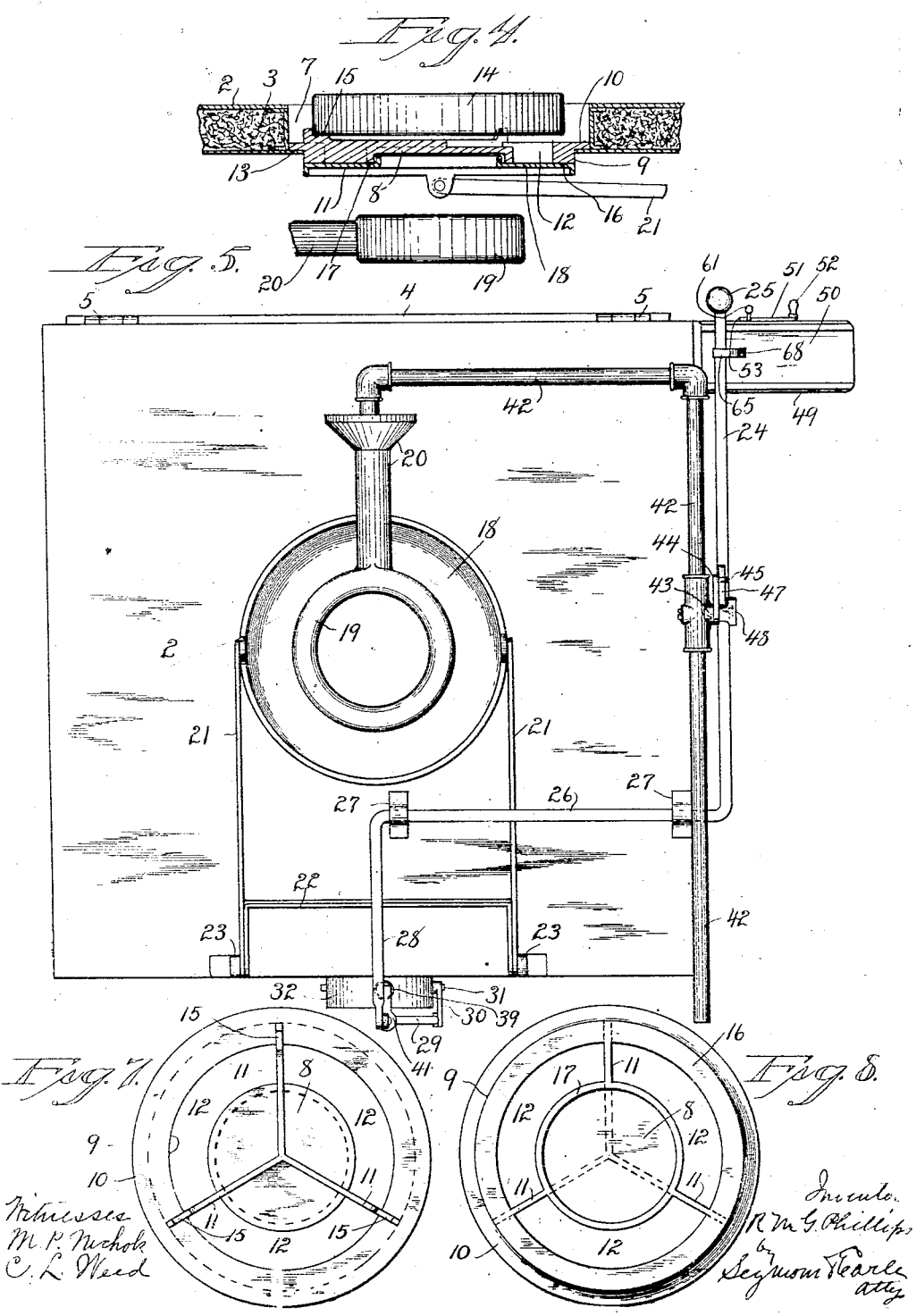

UNITED STATES PATENT OFFICE.

ROSS M. G. PHILLIPS, OF WEST HAVEN, CONNECTICUT.

AUTOMATIC COOKING APPARATUS.

1,161,523.  Specification of Letters Patent.  Patented Nov. 23, 1915.

Application filed October 9, 1914. Serial No. 365,944.

*To all whom it may concern:*

Be it known that I, ROSS M. G. PHILLIPS, a citizen of the United States, residing at West Haven, in the county of New Haven and State of Connecticut, have invented a new and useful Improvement in Automatic Cooking Apparatus; and I do hereby declare the following, when taken in connection with the accompanying drawings and the characters of reference marked thereon, to be a full, clear, and exact description of the same, and which said drawings constitute part of this application and represent, in—

Figure 1 a view in front elevation of an automatic cooking apparatus constructed in accordance with my invention. Fig. 2 a broken view thereof in right hand side elevation with a portion of the adjacent wall of the oven broken away to show the egress draft-passage in vertical section. Fig. 3 a broken view partly in elevation and partly in vertical transverse section, with the ingress-draft closure in its depressed or open position. Fig. 4 a corresponding view showing the ingress-draft closure in its elevated or closed position. Fig. 5 a reverse plan view of the apparatus. Fig. 6 a detached plan view of the ingress draft-passage closure. Fig. 7 a detached plan view of the skeleton or spider-like closure-seat. Fig. 8 a detached reverse plan view thereof.

My invention relates to an improved automatic gas-burning cooking apparatus having ingress and egress draft-passages and means for automatically closing the said passages and cutting off the gas at a predetermined time, the object being to provide simple, safe, convenient, economical and effective cooking apparatus of the character described.

With these ends in view, my invention consists in an automatic gas-burning cooking apparatus having certain details of construction and combinations of parts as will be hereinafter described and pointed out in the claims.

In carrying out my invention as herein shown, I employ a rectangular cooking compartment or oven 2 having double walls packed with insulating material 3, such as magnesia, the front of the oven being provided with a door 4 insulated in the same way and attached by hinges 5 to the base of the oven which is supported upon four legs
6. The bottom of the oven is formed with a central, circular opening 7 receiving a spider-like or skeletonized circular casting which I shall hereafter designate as the closure-seat, and which comprises an inverted cup-shaped baffle 8, a concentric sealing-ring 9, an annular supporting-flange 10, and radial ribs 11 which latter extend between the baffle 8 and the ring 9, whereby the latter is supported within the former with the production of three segmental draft-spaces 12 which together form an annular-ingress draft passage for the apparatus. The said closure-seat is supported in position within the circular opening 7 in the bottom of the oven 4 by the resting of its flange 10 upon the outer shell of the casing at the point 13 where the casing is extended inward into the said opening 7 as clearly shown in Fig. 5. As shown, a thermostone 14 is set into notches 15 in the outer ends of the upper edges of the ribs 11, the thermostone being sufficiently supported above the segmental draft-openings 12 not to block the annular ingress draft-passage formed thereby. I do not, however, limit myself to the use of a thermostone, nor to supporting it in the manner described.

The lower edge 16 of the sealing-ring 9 and the downwardly turned lower edge 17 of the baffle 8 are machined or otherwise finished in the same plane to provide a seat for the finished upper face of a circular, vertically movable annular plate 18 forming the ingress-draft closure of the apparatus, the said closure being interposed directly between the closure-seat aforesaid and an annular gas-burner 19 located at the inner end of the stem of a mixing-chamber 20, there being sufficient space between the lower face of the seat-closure and the upper face of the said burner to permit the closure 18 to be raised and lowered into its elevated or closed position in which it seals the three-part ingress draft-passage 12 and into its depressed or open position in which it permits the ready access of air to the said passage 12. The said closure 18 is pivotally mounted in the inner ends of the arms 21 of a yoke having a cross-bar 22, the outer ends of the said arms being pivotally mounted in brackets 23 depending from the bottom of the oven 2. For operating the said yoke to lift the closure 8 into its closed position, I employ a hand or operating lever 24 located on the right hand side of the oven, extending forward beyond the plane of the oven door 4 and furnished with a knob-like handle 25. The said lever 24 is bent at a right angle to form an inwardly extending supporting-member 26, which is journaled in brackets 27 depending from the bottom of the oven. From the inner end of the said member 26, the lever is bent rearward at a right angle to form an operating-arm 28 which extends under the cross-bar 22 of the yoke carrying the closure 18. The extreme rear end of the said arm 28 is pivoted to the lower end of a vertically arranged operating-rod 29 located centrally back of the oven and connected at its upper end with a short crank-arm 30 fastened to the outer end of a horizontal rock-shaft 31 journaled at its ends in a collar 32 projecting rearwardly from the back of the oven near the top thereof for the application of a pipe (not shown) for carrying off the waste products of combustion and the odors of cooking. The said collar is set into a cast damper-frame or housing 33 which in turn is set into the broken away upper rear corner of the oven 2 over a casting 34 containing an egress draft-passage 35 which is opened and closed by a closure or damper 36 located within the housing 33 and provided upon its upper face with a bail 37 engaged for operating the damper by an arm 38 extending inwardly from the rock-shaft 31 aforesaid. So far as the provision of my improved oven with an egress draft-passage and a closure therefor is concerned, these details may be widely varied without departing from my invention which only requires that the said damper or closure 36 shall be automatically operated in conjunction with the closure 18 of the three part ingress draft-passage 12. A helical spring 39 having its upper end connected with a bracket 40 upon the back of the oven, and its lower end connected with an adjustable collar 41 mounted upon the rod 29, exerts a constant effort to lift the said rod and to operate the closure 18 and the damper 36 in closing the ingress and egress draft-passages respectively.

Gas is supplied to the mixing-chamber 20 through a gas-supply pipe 42 containing a gas-cock 43 of any approved construction and having an arm 44 furnished with a pin 45 entering a slot 46 in the lower end of a link 47 the upper end of which is pivoted to the operating-lever 24 as shown in Fig. 2. The said long slot 46 prevents the cock 43 from being automatically opened when the hand-lever 24 is raised for opening the ingress and egress draft-passages 12 and 34 already described. This is a desirable precaution since otherwise the user of the cooking apparatus might raise the lever 34 and forget to light the gas which might then flood the oven 2 with gas and contaminate the food, and perhaps lead to explosions of gas and air. For the manual turning on of the gas the cock is provided with a key 48.

For automatically closing the ingress draft passage 12 and shutting off the supply of gas at a predetermined time, I employ a timing-apparatus which, as herein shown, is located within a case 49 supported upon a bracket-base 50 projecting from the right hand side of the oven 2. In its details this timing-mechanism may assume a great variety of forms. As shown, it is of the type disclosed in my pending application Serial No. 782,445, filed August 1, 1913. As far as shown herein, this apparatus has a setting-lever 51 furnished at its lower end with a handle 52 and provided at its upper end with an indicator 53 sweeping over a graduated dial 54 placed upon the outside of the case 49. The said lever 51 is mounted upon the projecting outer end of an arbor 55 mounting a timing-disk 56 located within the case 49 and having a radial slot 57 receiving a timing-pin 58 in a lever 59 also located within the said case, hung upon a pin 60 and provided at its lower end with a handle 61 projecting through a segmental slot 62 in the front of the case. The said lever 59 is connected by a link 63 with the arm 64 of a latch 65 hung upon a pin 66, the lower end of the latch projecting downwardly through the bottom of the case 49 in position to be hooked under the hand-lever 34 which it thus maintains in its elevated position against the tension of the spring 39. A spring 67 attached to the lever 59 is provided for smartly lifting the same as soon as the reverse rotation of the timing-disk 56 has registered the slot 57 thereof with the timing-pin 58 and thus released the lever 59 to the action of the spring 67 which lifts the lever 59 and its link 63 and so operates the latch 65 which is furnished with a forestalling finger-piece 68 to permit it to be manually operated in advance of its automatic operation by the timing mechanism. A slot 69 in the lower end of the link 63 permits this forestalling function of the latch 68.

In the operation of my improved apparatus, the timing mechanism is first set by means of the setting-lever 51. The hand-lever 24 is then manually lifted by its knob 25 against the tension of the spring 39 until the lever has been snapped over, as it were, the nose of the yielding latch 65 which then maintains the lever in its elevated position in which it is shown in Figs. 1 and 2. The lifting of the lever 24 as described, lifts the damper 36 clear of the egress-draft passage 35 and permits the closure 18 to drop by gravity away from the closure seat so as to open the three-part ingress draft-passage 12. The gas is now manually turned on by the key 48 of the gas-cock 43 and the burner 13 lighted. Prior to this time, the food has presumably been placed within the oven 2 through its door 4. When the gas is lighted at the burner 19, the flame passes upward through the central opening of the closure 18 whereby it is concentrated against the baffle 8 by means of which it is deflected outwardly into the three-part ingress draft-passage 12. The heated air now rises through the oven 2 from which it emerges through the egress draft-passage 35 to be carried off by the flue which is not shown. At the termination of the predetermined period to which the timing mechanism was set, the latch 68 is automatically retracted from engagement with the lever 24, permitting the spring 30 to assert itself in lifting the rod 29, whereby the damper 36 is closed down upon the egress draft-passage 35, whereby the closure 10 is lifted against the finished surfaces 16 and 17 of the seat-closure, and whereby, also, the gas-cock 43 is operated through its arm 44 for automatically shutting off the supply of gas to the burner 19. The heat so supplied to the oven is thus conserved for the continuation of the cooking operation until it is slowly dissipated by radiation from the apparatus.

I claim:

1. In a cooking apparatus, the combination with a cooking compartment having an ingress draft-passage, of a heater located below the said passage, a vertically movable closure interposed between the said heater and passage for closing the latter, cocking means for maintaining the said closure in its open position, automatic means for releasing the said cocking means to permit the said closure to close the said passage, and means for manually opening the said closure and setting the said cocking means to maintain the closure in its open position subject to the releasing action of the said automatic releasing means.

2. In an automatic cooking apparatus, the combination with a cooking compartment having an ingress draft-passage, of a heater located below the said passage, a vertically movable closure interposed between the said passage and the heater, cocking means for maintaining the closure in its open position, automatic means for releasing the said cocking means to permit the closure to close the said passage, means for manually opening the said closure and setting the cocking means to maintain the closure in its open position subject to the releasing action of the said automatic releasing means, and a gas-cock automatically controlled in shutting off gas from the heater by the said automatic releasing means, and manually operable for turning on the gas.

3. In a cooking apparatus, the combination with a cooking compartment or oven having an ingress and an egress draft-passage, of a closure for the egress draft-passage, a heater located below the ingress draft-passage, a vertically movable closure interposed between the heater and the ingress draft-passage for closing the same, a yoke mounting the said closure, an operating lever connected with the said yoke for lifting the same, connection between the said lever and the closure for the said egress draft-passage, and automatic means co-acting with the said lever for controlling the simultaneous operation of the said closures in closing the said passages which are manually opened by the said lever.

4. In a cooking apparatus, the combination with a cooking compartment, of a closure-seat located therein and containing an ingress draft-passage, a heater, a vertically movable closure interposed between the said closure-seat and heater and adapted to be lifted against the former for closing the ingress draft-passage therein, cocking means for maintaining the said closure in its open position, automatic means for releasing the said cocking means to permit the said closure to close, and means for manually opening the said closure and setting the said cocking means to maintain the closure in its open position subject to the releasing action of the automatic releasing means.

5. In a cooking apparatus, the combination with a cooking compartment, of a closure-seat mounted therein and containing an ingress draft-passage, a heater located below the said closure-seat, a vertically movable closure interposed between the said closure-seat and heater, cocking means for maintaining the closure in its open position, means for automatically releasing the said cocking means to permit the closure to close, means for manually opening the said closure and setting the cocking means to maintain the closure in its open position subject to the releasing action of the automatic releasing means, and a heat-conserver superimposed upon the said closure-seat.

6. In an automatic cooking apparatus, the combination with the cooking compartment or oven, having an egress draft-passage, of a closure-seat mounted in the lower end thereof and having a centrally located baffle surrounded by an ingress draft-passage, a heater, an annular closure interposed between the closure-seat and heater with its central opening in line with the baffle of the closure-seat, and means for automatically controlling the closing movement of the said closure.

7. In a cooking apparatus, the combination with a cooking compartment, of a closure-seat mounted therein and containing an ingress draft-passage, a baffle partly closing the said passage, a heater, a closure interposed between the said heater and closure-seat and adapted to close that part of the ingress draft-passage not closed by the said baffle, cocking means for maintaining the closure in its open position, means for automatically releasing the cocking means to permit the closure to close, and means for manually opening the said closure and setting the said cocking means to hold the closure open subject to the releasing action of the automatic releasing means.

8. In a cooking apparatus, the combination with a cooking compartment having an ingress draft-passage, of a heater located below the said passage, a vertically movable closure interposed between the said heater and passage for closing the latter, cocking means for maintaining the said closure in its open position, automatic means for releasing the said cocking means to permit the said closure to close the said passage, means for manually opening the said closure and setting the said cocking means to maintain the closure in its open position subject to the releasing action of the said automatic releasing means, and a fuel-valve automatically controlled in being closed to accord with the closing of the said closure and adapted to be manually opened after the setting of the said cocking means.

In testimony whereof, I have signed this specification in the presence of two subscribing witnesses.

ROSS M. G. PHILLIPS.

Witnesses:
C. L. WEED,
FREDERIC C. EARLE.